United States Patent [19]
Anderson et al.

[11] 3,763,761
[45] Oct. 9, 1973

[54] VEHICLE HEATING AND COOLING MECHANISM

[75] Inventors: George Fred Anderson, Chula Vista; Charles C. Hill, La Jolla, both of Calif.

[73] Assignee: Rohr Industries Inc., Chula Vista, Calif.

[22] Filed: Apr. 27, 1972

[21] Appl. No.: 248,100

[52] U.S. Cl............................. 98/9, 98/33, 98/10, 98/39, 98/43, 165/126, 62/419
[51] Int. Cl............................................. F24f 13/00
[58] Field of Search ............. 98/33 A, 33 R, 43 PS, 98/39, 9, 10; 165/123; 62/419

[56] References Cited
UNITED STATES PATENTS

| 2,268,502 | 12/1941 | Browne | 98/10 |
| 2,275,295 | 3/1942 | Greenway | 165/123 |
| 2,422,560 | 6/1947 | Palmer | 98/10 |
| 3,032,323 | 5/1962 | Church | 165/123 |
| 3,159,089 | 12/1964 | Eggert | 98/10 |

FOREIGN PATENTS OR APPLICATIONS

| 50,179 | 12/1889 | Germany | 62/419 |
| 389,230 | 3/1933 | Great Britain | 98/10 |

*Primary Examiner*—William J. Wye
*Attorney*—George E. Pearson

[57] ABSTRACT

A combined heating and air conditioning system for a vehicle comprises a high pressure air line extending lengthwise centrally between two sets of heat transfer tubes in a chamber provided in the roof structure of the vehicle. A plurality of laterally outwardly directed nozzles discharge air jets from the line into laterally directed ejector tubes, which mix the jet air with injected return air drawn upwardly through a center grille in the vehicle ceiling and direct the mixed air transversely across the heat transfer tubes, which are selectively heated or cooled as required. The heated or cooled air flows through a gradually widened chamber and is then discharged downwardly across the vehicle windows and into the passenger zone, where it diffuses and eventually is drawn back up through the grille into the roof chamber for recirculation.

5 Claims, 3 Drawing Figures

VEHICLE HEATING AND COOLING MECHANISM

BACKGROUND OF THE INVENTION

It is common in heating, and, when provided, in cooling vehicles, such as buses and cars of a mass transportation system, to employ mechanisms which either heat or cool circulating air at some suitable location in the vehicle, and then duct the heated or cooled air along the sides of the vehicle and discharge it at selected areas throughout the length of the vehicle such as beneath the seats or through outlets provided in the window sills. Such heating and cooling mechanisms are usually undesirably bulky, and when the ducted air provided thereby is discharged upwardly through openings provided either near the floor level or at the sills of the windows it flows upwardly across the windows away from the passenger zone, where it becomes either cooled if hot, or heated if cold, so that its effectiveness for controlling passenger comfort is thereby greatly reduced.

A recent development in the manufacture of such vehicles is to complete the entire roof structure as a separate unit, with all accessory equipment installed in a chamber provided between the ceiling and the roof, to complete the walls with all their accessory equipment installed, including fully or partly cantilevered seats, and then to assemble the roof and walls on a chassis having a permanent floor covering installed. Then, after such assembly, no further work is required to complete the interior of the vehicle. Such a procedure is described in greater detail in co-pending U.S. Pat. application Ser. No. 230,689, filed Mar. 1, 1972, and the present invention lends itself well to such manufacturing procedure, since the entire air conditioning system can be mounted in the roof assembly if desired.

PURPOSE OF THE INVENTION

A primary objective of the present invention is to reduce the space required for ducting conditioned air along the length of the vehicle, and the space required for high volume blowers for air distribution. A further objective of the invention is to provide vehicle air conditioning mechanism mounted in a chamber provided in the roof structure of such vehicle and employing a plurality of nozzles mounted in a high pressure air line and directing high velocity air jets into individual ejector tubes, which tubes are so directed and arranged that their inlet ends draw return air through a grille in the ceiling for mixture with the jet air from the nozzles, and their outlet ends discharge streams of mixed air across one or more heat transfer tubes, also mounted in the roof chamber, whence the heated air flows downwardly across the vehicle windows and into the passenger zone of the vehicle where it is diffused and is eventually drawn back through the return grille for recirculation.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
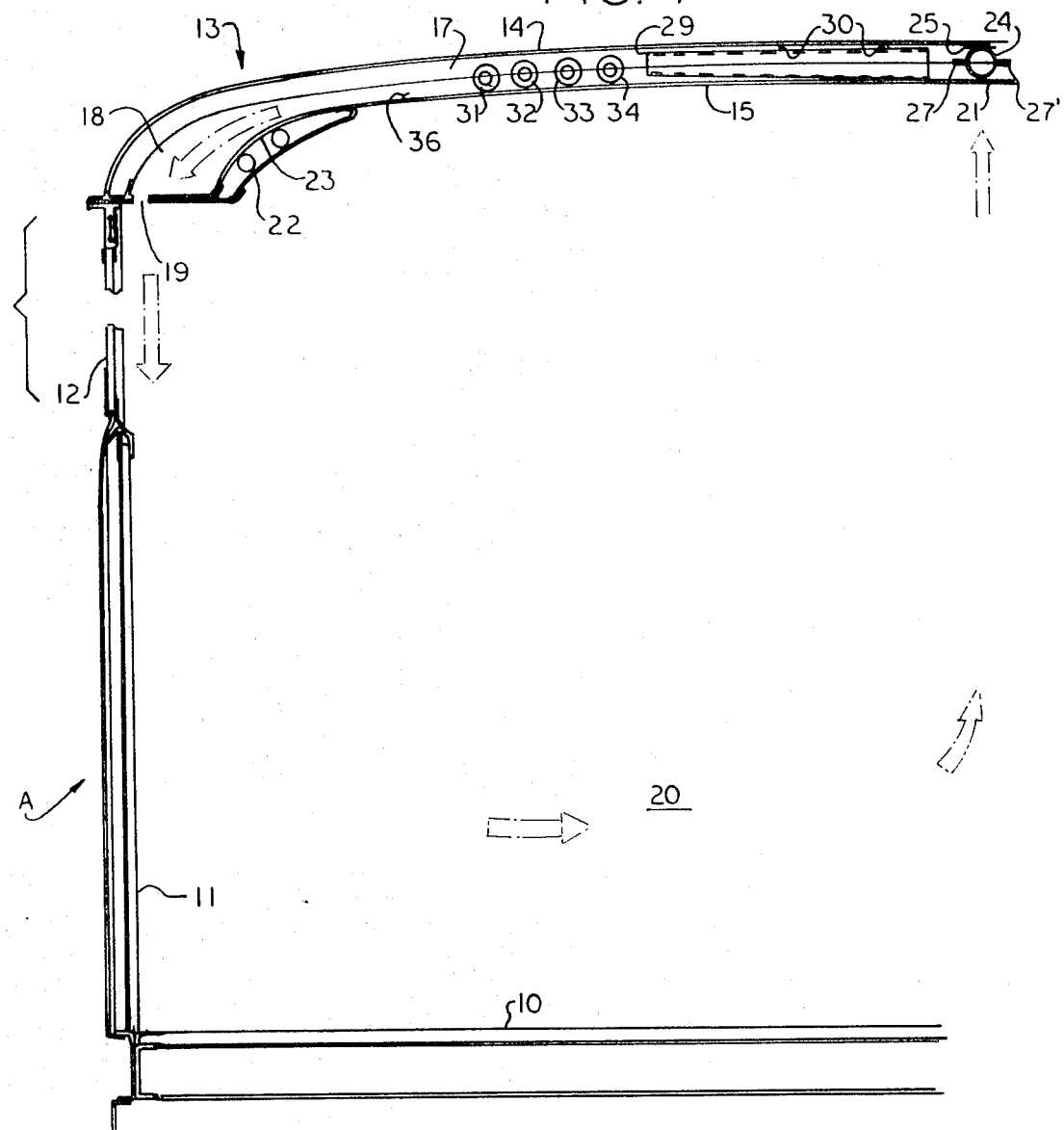
FIG. 1 is somewhat diagrammatic, fragmentary, transverse, vertical, sectional view through a portion of a bus body embodying the invention, intermediate portions being broken away.
Figure 2:
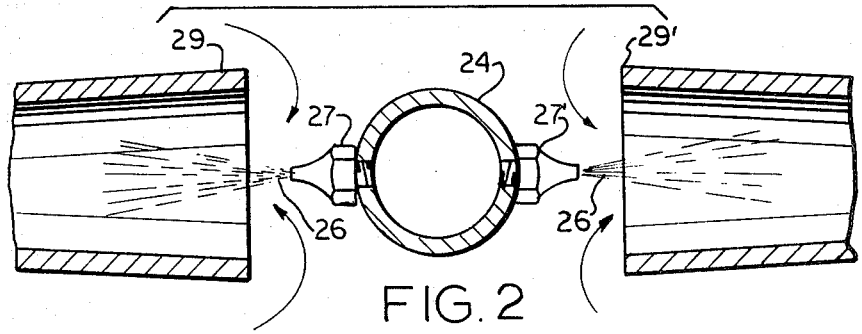
FIG. 2 is an enlarged, fragmentary, transverse, vertical, sectional view through the high pressure air line showing two of the nozzles and the inlet end portions of the two ejector tubes axially aligned therewith.

Referring to the drawings in detail, a vehicle body A comprises a floor 10, walls 11 with windows 12 installed therein, and a roof structure 13 comprising an insulative roof 14 and a ceiling 15 spaced therefrom to form a chamber 17 therebetween.

The side portions of the roof 14 and ceiling 15 curve downwardly at divergent rates of curvature so as to provide gradually widening zones 18 and 18' along the sides of the roof chamber 17. A horizontal register or slot 19 is provided along the bottom of each widened chamber side zone 18 and 18' whence the air flows downwardly across the windows 12 and into the passenger zone 20.

A return air grille 21 is provided lengthwise along the center of the ceiling 15 to admit return air to the roof chamber 17 for recirculation. A plurality of light fixtures 22 and 22' may be provided along the downwardly curved ceiling side portion 23 and 23', which fixtures may be of a well known type marketed under the trademark LUMINATOR.

A high pressure air line 24 is mounted by brackets 25 to extend lengthwise in the center of the roof chamber 17 above the return air grille 21, and is provided with a number of laterally directed air jet nozzles 27 and 27' screwed into threaded holes provided along each side of the line 24. Compressed air for the line 24 is provided by suitable means such as a conventional air compressor, not shown, which may be mounted at any desired location in the vehicle, and operated by any suitable or conventional means, such as, for example, belt drive from the vehicle propulsion engine, by an auxiliary engine, or by an electrical motor which may be energized by the vehicle's usual electrical system, not shown. Preferably such compressor is mounted in a compartment 28 provided by lowering the ceiling 15 a slight distance for the rear few feet thereof and sealing off the compartment thus formed from the remainder of the chamber 17. Intake air to such compressor may comprise fresh air drawn from the atmosphere exteriorly of the vehicle, recirculated air drawn from within the vehicle, or a mixture of the two as desired. Since such compressors, their drive mechanisms and air intake controls are of well known types, and are not per se features of the present invention, they are omitted from the present specification.

A plurality of ejector tubes 29 and 29', having circular inlet ends and flattened, laterally flared outlet ends, are mounted by brackets 30 to position the inlet end of an ejector tube 29 substantially coaxially of each nozzle 27, and positioned axially relatively thereto as required to provide required ejector action in accordance with well known principles.

Heat transfer tubes 31 – 34 and 31'– 34' may be conventional finned tubes, for example copper tubes with radially extending copper fins such as are well known and are marketed by numerous manufacturers of refrigerating and air conditioning mechanism and supplies. Two pairs of heat transfer tubes are provided on each side of the chamber 17. For example, each pair of tubes 31 and 32, and 31*f* and 32' may be the two sides of a loop connected to circulate heated fluid, for example, steam or hot water from a conventional boiler; while the other two tubes on each side 33 and 34, and 33' and 34' are for circulating cold fluid, and may, for example, comprise the evaporator of a conventional mechanical refrigerating system, not shown. Suitable means, such as deflector plates 36 sealed to the sloping ceiling plate 15 are provided to deflect condensate from the cooling tubes to suitable disposal means, such as tubes, not shown, extending down through selected mullions of the vehicle as required. Since a fluid heater or boiler for supplying hot fluid for the heated tubes, and a motor-compresser-condenser unit for supplying cold fluid for the cold tubes are both relatively small, they can both be mounted at any of several convenient locations in the vehicle, a presently preferred location therefor being in the compartment 28 mentioned previously herein. Flow of hot or cold fluids through the respective heat transfer tubes may be regulated by conventional controls, including thermostats, switches, valves, etc., in a well known manner.

OPERATION

In the operation of the invention, assuming first that the illustrated embodiment of the invention is to be used to heat the interior of the vehicle body A, heated fluid is circulated through the heat taansfer tubes 31 and 32, and 31' and 32', while the other heat transfer tubes 33 and 34, and 33' and 34' remain inactive. Compressed air from the line 24 is discharged from the nozzles 27 and 27' in the form of jets 26 at a required velocity into the inlet ends of their respective ejector tubes 29 and 29'. The ejector action thus caused draws air from the zone above the return air grille 21 into the ejector tubes where the jet and return air are thoroughly intermixed. The ejector action tends to reduce the pressure in the zone above the grille 21 to induce a flow of return air upwardly through the grille.

Figure 3:
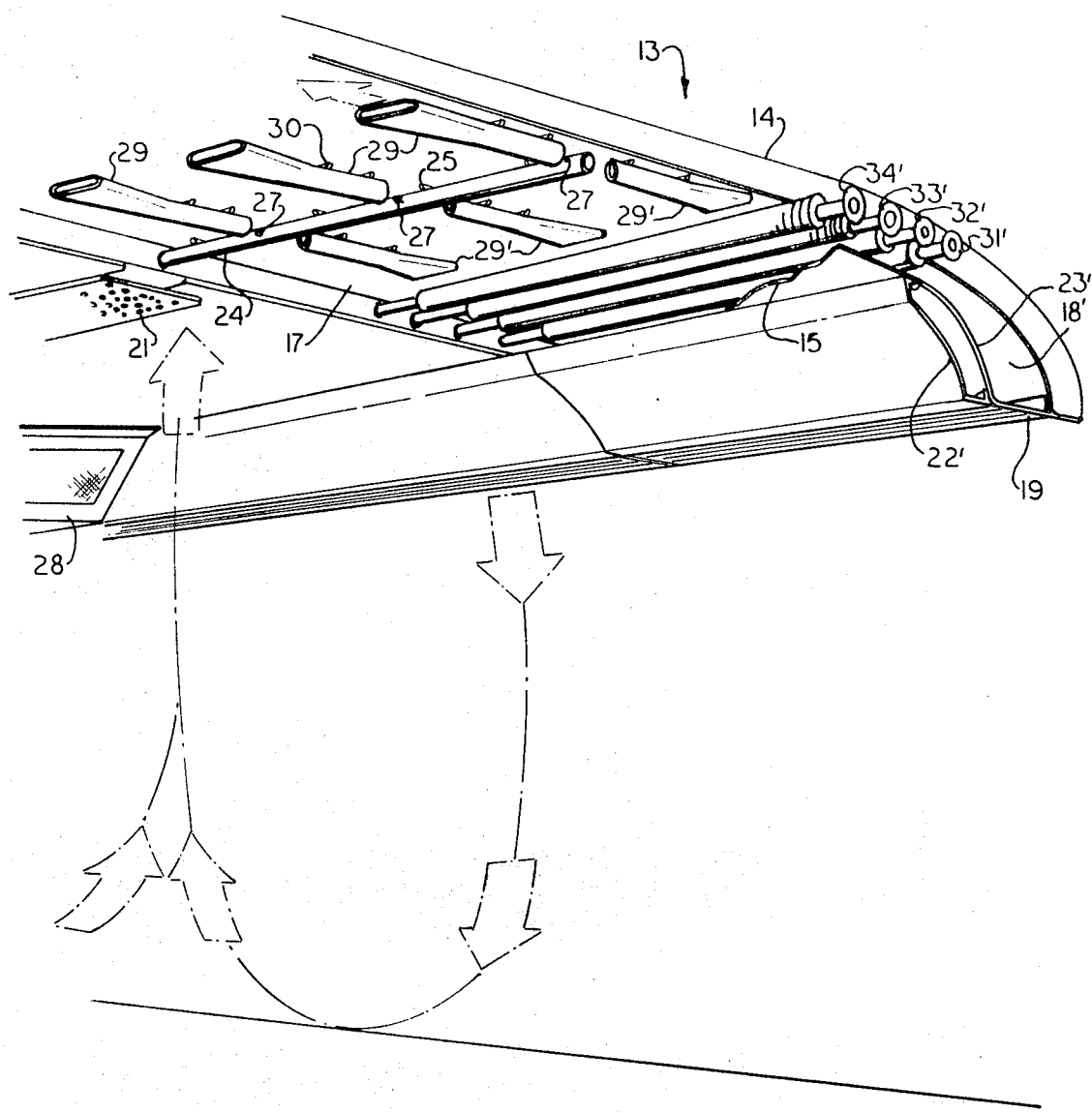
FIG. 3 is a somewhat diagrammatic, fragmentary, perspective view of the upper portion of the installation shown in FIG. 1, portions being broken away and the general direction of circulating air movement being indicated by arrows.

From the laterally outward ends of the ejector tubes 29 and 29' the intermixed jet and return air is discharged, at a velocity substantially less than that of the jets 26, transversely across the heated heat transfer tubes along each side of the ceiling compartment 28, whereby this air is heated and flows on into the outwardly diverging zones 18 and 18' at the sides of the chamber 17, where its velocity is further reduced. The heated air is then discharged through the registers or slots 19 as indicated by the arrows in FIGS. 1 and 3 and flows downwardly across the windows 12 and into the passenger zone 20 of the vehicle, where it is diffused and gradually returns to the vicinity of the grille 21. There it is drawn into the roof chamber 17 for recirculation as explained previously herein and the cycle is repeated continuously as long as the mechanism remains in operation.

For cooling the interior of the vehicle body A, with the flow of heated fluid through the tubes 31 and 32, and 31' and 32' shut off, cold fluid, for example a freshly evaporated refrigerant gas, such as Freon, is circulated through the heat transfer tubes 33 and 34, and 33' and 34'. Otherwise the operation of the mechanism is the same for either heating or cooling.

The invention provides a simple, light weight, compact, relatively inexpensive, draft free and reliable vehicle heating and cooling system. Since the heating and cooling fluids and the mechanism for providing them can be of small volume and the respective fluids may operate at relatively large temperature difference from the air to be either heated or cooled, only relatively small volumes of such fluids are required. Also, a desired mixture of fresh and return air can readily be provided, and this mixture retained without change of setting whether the mechanism is used for heating or cooling.

Having thus described my invention, what I claim as new and useful and desire to protect by U.S. Letters Patent is:

1. Mechanism for controlling by ejector action the circulation, make-up, and temperature of air in the passenger compartment of a transportation type vehicle having a chamber located above the passenger compartment between the roof of such vehicle and a ceiling spaced downwardly therefrom, such chamber having an air discharge opening into the passenger compartment extending along each side of the ceiling, and an air return opening from the passenger compartment extending longitudinally of the center of the ceiling, a high pressure air line extending longitudinally within the chamber above such air return opening, a plurality of nozzles mounted at spaced intervals along each side of the air line to discharge jets of compressed air from the air line laterally in both directions into such chamber in the form of high velocity air jets, a plurality of ejector tubes, each having a small inlet end and a wide, flattened discharge end mounted transversely of the chamber with the inlet end of each thereof located in the zone of such return air opening, and in ejector relation with its associated nozzle, and the discharge end thereof directed laterally outwardly to direct a stream of mixed nozzle and return air discharged therefrom toward and downwardly through each air discharge opening into the passenger compartment, and a controlled temperature, heat transfer tube mounted to extends along each side of the chamber in the path of the air streams discharged by the ejector tubes along such each side of the chamber.

2. Air control mechanism as claimed in claim 1 wherein the roof and ceiling curve downwardly in divergent curves as they near each side of the bus to define a gradually widened, downwardly curved chamber portion therebetween, and at least one air discharge opening is provided at the lower, laterally outward end of each of such chamber portion.

3. Air control mechanism as claimed in claim 1 wherein at least two heat transfer tubes extend longitudinally along each side of the chamber, one for circulating high temperature fluid, and the other for circulating low temperature fluid therein.

4. Air control mechanism as claimed in claim 1 wherein each air discharge opening is located to discharge a stream of air from the chamber downwardly across a window provided in each side of the passenger compartment.

5. A combined heating and air conditioning system for the passenger compartment of a transportion type vehicle having a chamber above the passenger compartment defined by, and located between, the roof and ceiling of such vehicle, such chamber haVing a downwardly directed air discharge opening into the passenger compartment extending lengthwise along each side of such ceiling, and having an air return opening from the passenger compartment extending lengthwise centrally of such ceiling, a compressed air line extending from a point exteriorly of, and lengthwise within, such chamber above such air return opening, a plurality of laterally directed nozzles mounted at spaced intervals along each side of the air line to discharge a laterally directed jet of air from each nozzle, a plurality of laterally directed nozzles mounted at spaced intervals along each side of the air line to discharge a laterally directed jet of air from each nozzle.

a laterally directed ejector tube mounted with its inlet end operatively associated with each nozzle and its outlet end directed laterally toward one of such discharge openings, each ejector tube flaring outwardly from its inlet toward its outlet end to reduce the speed of a stream of mixed nozzle, and return air flowing therethrough by ejector action, and at least one temperature controlled heat transfer element mounted in the paths of the streams of air flowing by ejector action thorugh said ejector tubes for controlling the temperature of such air for discharge downwardly through the discharge opening into the passenger compartment.

* * * * *